(12) United States Patent
Fort, II

(10) Patent No.: US 7,000,566 B2
(45) Date of Patent: Feb. 21, 2006

(54) BIRD BATH WITH RESERVOIR

(75) Inventor: W. Grady Fort, II, Mason, TX (US)

(73) Assignee: Daisy Manufacturing Co., Rogers, AR (US)

( * ) Notice: Subject to any disclaimer, the term of this patent is extended or adjusted under 35 U.S.C. 154(b) by 19 days.

(21) Appl. No.: 10/751,438

(22) Filed: Jan. 6, 2004

(65) Prior Publication Data
US 2005/0145184 A1   Jul. 7, 2005

(51) Int. Cl.
*A01K 39/026*  (2006.01)
*A01K 45/00*   (2006.01)

(52) U.S. Cl. ........................... 119/69.5; 119/72

(58) Field of Classification Search ............... 119/69.5, 119/51.5, 72, 72.5, 77
See application file for complete search history.

(56) References Cited

U.S. PATENT DOCUMENTS

| | | | | |
|---|---|---|---|---|
| 1,566,571 A | * | 12/1925 | Appleton | 119/77 |
| 2,715,386 A | * | 8/1955 | Jones | 119/51.5 |
| 5,195,463 A | * | 3/1993 | Lorenzana et al. | 119/77 |
| 5,207,182 A | * | 5/1993 | Lorenzana | 119/77 |
| 5,423,291 A | * | 6/1995 | Daugherty | 119/77 |
| 5,438,957 A | * | 8/1995 | Shagoury | 119/69.5 |
| 5,488,927 A | * | 2/1996 | Lorenzana et al. | 119/51.5 |
| 5,730,082 A | * | 3/1998 | Newman | 119/51.5 |
| 5,904,117 A | * | 5/1999 | Castro | 119/51.5 |
| 6,119,628 A | * | 9/2000 | Lorenzana et al. | 119/77 |
| 6,257,288 B1 | * | 7/2001 | Davidian et al. | 141/324 |
| 6,354,244 B1 | * | 3/2002 | Green | 119/429 |
| 6,484,666 B1 | * | 11/2002 | Reusche | 119/69.5 |
| 6,634,316 B1 | * | 10/2003 | Desatoff | 119/69.5 |

* cited by examiner

*Primary Examiner*—Teri Pham Luu
*Assistant Examiner*—Bret Hayes
(74) *Attorney, Agent, or Firm*—Pillsbury Winthrop Shaw Pittman LLP

(57) ABSTRACT

A bird bath that can be coupled to a reservoir. An exemplary embodiment of the invention is a bird bath that includes a coupling portion and a basin portion. The coupling portion is configured to be coupled to a water reservoir. The basin portion is configured to receive water from the reservoir to function as a bird bath. The basin portion includes one or more basins that are sized to accommodate at least one bird.

39 Claims, 11 Drawing Sheets

BIRD BATH WITH RESERVOIR

BACKGROUND

1. Field of the Invention

The present invention relates generally to a bird bath and, more particularly, to a bird bath and waterer that can be coupled to a reservoir.

2. Background of the Invention

Conventional bird baths in use includes pre-cast concrete units and flat bottom saucers. The pre-cast bird baths are heavy, and are typically set on the ground. The flat bottom saucers are hung in a tree and are commonly made of ceramic or metal. Birds take "baths" in these conventional bird baths and also drink, or water, from them.

Each conventional bird bath has a serious drawback: the water it contains can quickly become contaminated when used. In other words, all the water associated with or supplied to the conventional bird bath is exposed at once to bird droppings, windblown dust, etc. As known to their users, water in these conventional bird baths can become very dirty and contaminated in a short period of time, since they contain a relatively small amount of static water that is constantly exposed. As a result, conventional bird baths require frequent cleaning and the frequent manual addition of fresh water. In addition, dirty feces contaminated water can potentially cause disease problems among the bird population. Finally, birds stop using the bird bath when the water becomes heavily contaminated.

SUMMARY OF THE INVENTION

The inventor of the present application has recognized a need for a novel bird bath, which provides fresh, uncontaminated water that automatically flows from a protected reservoir as needed. Only a small portion of the water is exposed at any one time.

The present invention is a bird bath that can be coupled to a reservoir. Briefly, a bird bath of the invention includes a coupling portion and a basin portion. The coupling portion is configured to be coupled to a water reservoir. The basin portion is configured to receive water from the reservoir to function as a bird bath. Accordingly, the basin portion includes one or more basins that are sized to accommodate at least one bird. Benefits associated with the bird bath of the invention include: less maintenance/work by the user and less disease potential among the birds and greater usage by birds because of more sanitary conditions. Another benefit of the invention is that the entire bird bath can be appropriately sized to be utilized in natural surroundings like hanging in a tree.

As water level decreases in the basin portion of the bird bath, either due to spillage from bird bathing, consumption of water by birds, or by evaporation, water flows from the reservoir to fill the basin portion. When water in the basin portion rises up to a predetermined level, an equilibrium is reached between a vacuum in the reservoir and an external air pressure above the water level of the basin. The air pressure/vacuum equilibrium prevents additional flow of water out of the reservoir. This air pressure/vacuum equilibrium principle is sometimes referred to as the vacuum/air pressure balance principle, or in short, the vacuum principle.

One aspect of the invention provides a wide perching area along an edge or a rim of the basin portion. The perching area allows birds to securely grasp using their fourth toe (the opposing digit similar to a human thumb). The perching area preferably includes an under-cut or a cantilever to accommodate firm contraction of the fourth toe.

Another aspect of the invention provides a support portion. The support portion is configured to support one or more of the coupling portion and the basin portion. Preferably, the support portion includes an inset or sleeve under the coupling portion. The sleeve allows the bird bath to be mounted on a mounting post. For example, the sleeve is preferably configured to slip over a standard 4" by 4" lumber post. Preferred embodiments of the invention provide that the length of the sleeve is preferably about half of the thickness of the mounting post. For example, the sleeve should be about two inches or longer when mounted on a 4" by 4" lumber post.

Another aspect of the invention provides that the support portion further includes one or more support ribs or legs. Preferably, a first end of each leg is connected to a basin of the basin portion and a second end of the leg touches a surface on which the bird bath is supported.

The preferred embodiment of the invention includes a support portion that includes both the sleeve and the legs. Preferably, each leg connects each of the basins to the sleeve. In an exemplary embodiment that includes four basins, each leg extends from the bottom surface of the basin to one corner of the sleeve. The "X" pattern formed by these legs allows the bird bath to be placed on any flat surface and still be stable even though it may be top heavy. Accordingly, the preferred embodiment of the invention can be post mounted, hung, or set on a flat surface.

Another aspect of the invention relates to consideration of designing a bird bath such that only a minimal amount of water would slosh out during wind sway if hung. This can be accomplished in three ways. First, by the use of multiple cups or basins, evenly spaced for balance when hung, which, in essence creates baffles to circular water flow around the unit. Breaking the water into smaller amounts also reduces the mass/weight available to slosh, which means momentum and wave action is lessened. Second, the rate of water repplenishement is taken into consideration through the area of water flow openings into the basins to slow flow and minimize slosh during swaying. Third, the actual water level relative to depth of the basins is also calculated to minimize slosh and is controlled by the height of these water openings.

Still another aspect of the invention provides a waterer that provides an operating position and a refilling position. The advantage of this invention is that the waterer can be refilled without detaching the reservoir from the base. In the operating position, water flows from the reservoir to the base via a channel until an air pressure/vacuum equilibrium is reached. To change the waterer from the operating position to the refilling position, the reservoir is lowered to shut off the channel. Then, an orifice associated with the reservoir is opened (e.g., by twisting off a cap), and additional water is poured into the reservoir via the orifice. After the orifice is closed (e.g., by twisting on the cap), the reservoir is raised to allow water in the reservoir to flow, via the channel, into the base until the air pressure equilibrium is reached.

BRIEF DESCRIPTION OF PREFERRED EMBODIMENTS

DETAILED DESCRIPTION OF PREFERRED EMBODIMENTS

Figure 1:
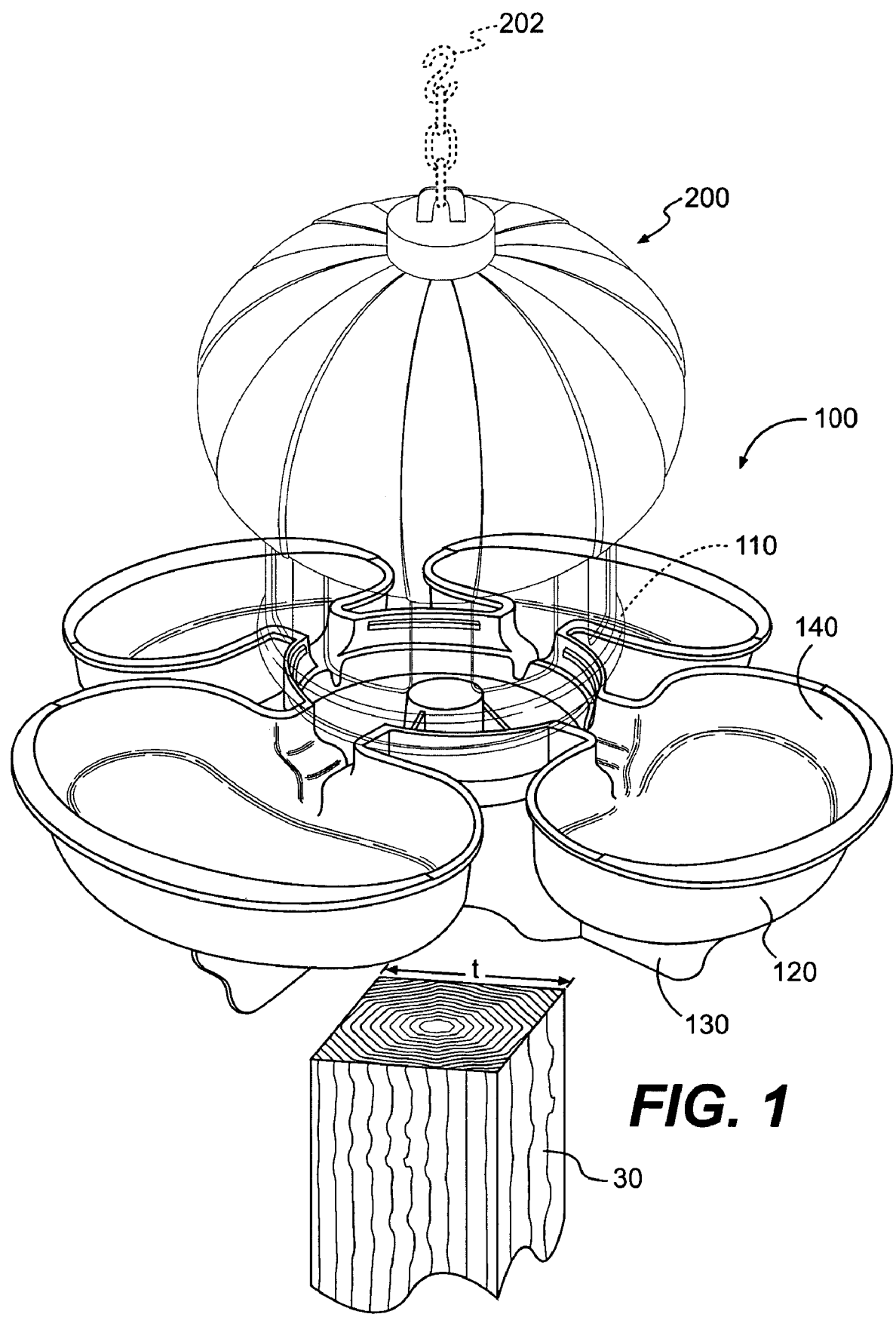
FIG. 1 shows a preferred embodiment of the invention in its fully assembled condition, which can be configured to be mounted on a mounting post hung on a tree limb or house eve, or set on any flat surface.

FIG. 1 shows a preferred embodiment of the invention in its fully assembled condition, which can be configured to be mounted on a mounting post or be hung in a tree. Bird bath 100 can be configured to be hung on a substantially horizontal support member, such as a tree branch or house eve. For example, hanging device 202 can be coupled to a top region of reservoir 200 for hanging purposes. Bird bath 100 can be configured to rest on a flat surface. Preferably, bird bath 100 includes support portion 130. Support portion 130 can preferably be mounted on mounting post 30. Mounting post 30, as explained below, can be a standard 4" by 4" lumber post, in which case, thickness, t, would be about 4 inches, nominally.

Figure 2:
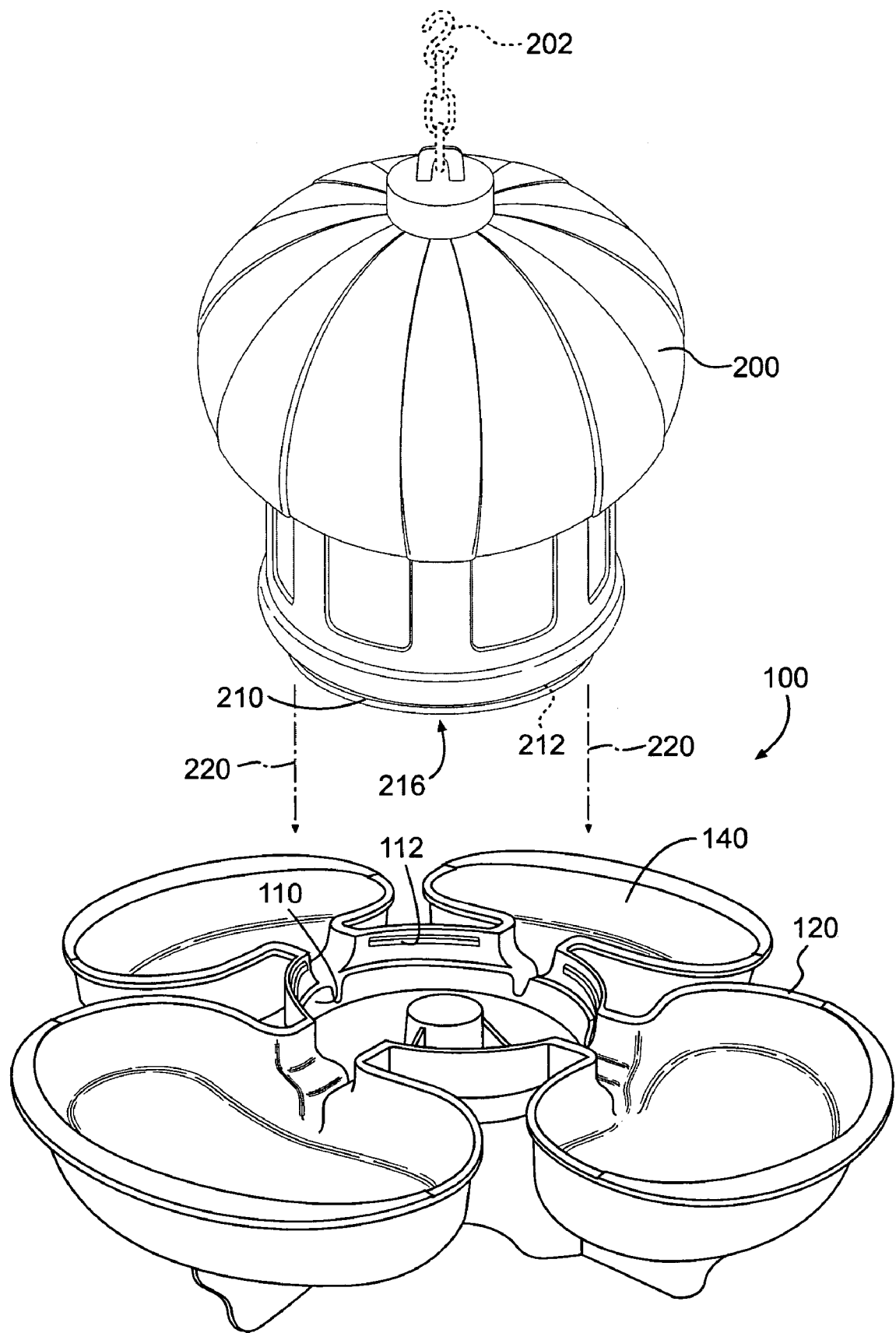
FIG. 2 shows the preferred embodiment of FIG. 1 in its disassembled condition that exposes a coupling region.

FIG. 2 shows the preferred embodiment in its disassembled condition that exposes coupling portion 110, which is configured to couple bird bath 100 with reservoir 200. Bird bath 100 includes coupling portion 110. Coupling portion 110 includes first mating unit 112. First mating unit 112 is configured to mate with second mating unit 212 associated with coupling region 210 of reservoir 200. When first mating unit 112 and second mating unit 212 are united as shown in FIG. 1, water flows from reservoir 200 into basin portion 120 until an air pressure equilibrium is reached.

Reservoir 200 is configured to contain water in interior 216. Preferably, interior 216 is configured to store about one-half gallon of water. Reservoir 200 may have a dome shape as shown in FIG. 1. Alternatively, reservoir 200 may be configured to have a more conventional cylindrical shape. Other shapes may be configured for reservoir 200. In other words, reservoir 200 can be of any shape or have any capacity so long as it includes second mating unit 212 that is configured to mate with first mating unit 112 of bird bath 100.

The reservoir design of the present invention requires significantly less frequent refilling, when compared to conventional products of the same water volume capacity. The reservoir design of the invention is superior to prior art products because less water is exposed to evaporation. Further, the reservoir design protects the majority of the water from contamination by feces, dust, dirt, etc.

First mating unit 112 and second mating unit 212 can be any suitable means that can couple reservoir 200 to bird bath 100. For example, mating units 112 and 212 can be complementary spiral threads that twist and lock onto each other. Alternatively, mating units 112 and 212 can include tongues and grooves that align, twist, and lock onto each other. Still other alternative mating units may include snap on mechanisms that couples reservoir 200 to bird bath 100 when reservoir 200 is pushed into coupling portion 110 in direction 220.

In addition to coupling portion 110, bird bath 100 includes basin portion 120. Basin portion 120 preferably includes at least one basin 140. As depicted in FIG. 1, the preferred embodiment of the invention includes four basins 140. Other embodiments many include two, three, or more than four basins. Preferably, basins 140 are equally or symmetrically spaced to provide stability and for aesthetic purposes. Each basin 140 is appropriately sized to accommodate at least one bird.

FIGS. 3, 4, 5, 6, and 7 provide different views of an exemplary bird bath of the invention. Bird bath 300 includes coupling portion 310, basin portion 320, and support portion 330.

Figure 3:
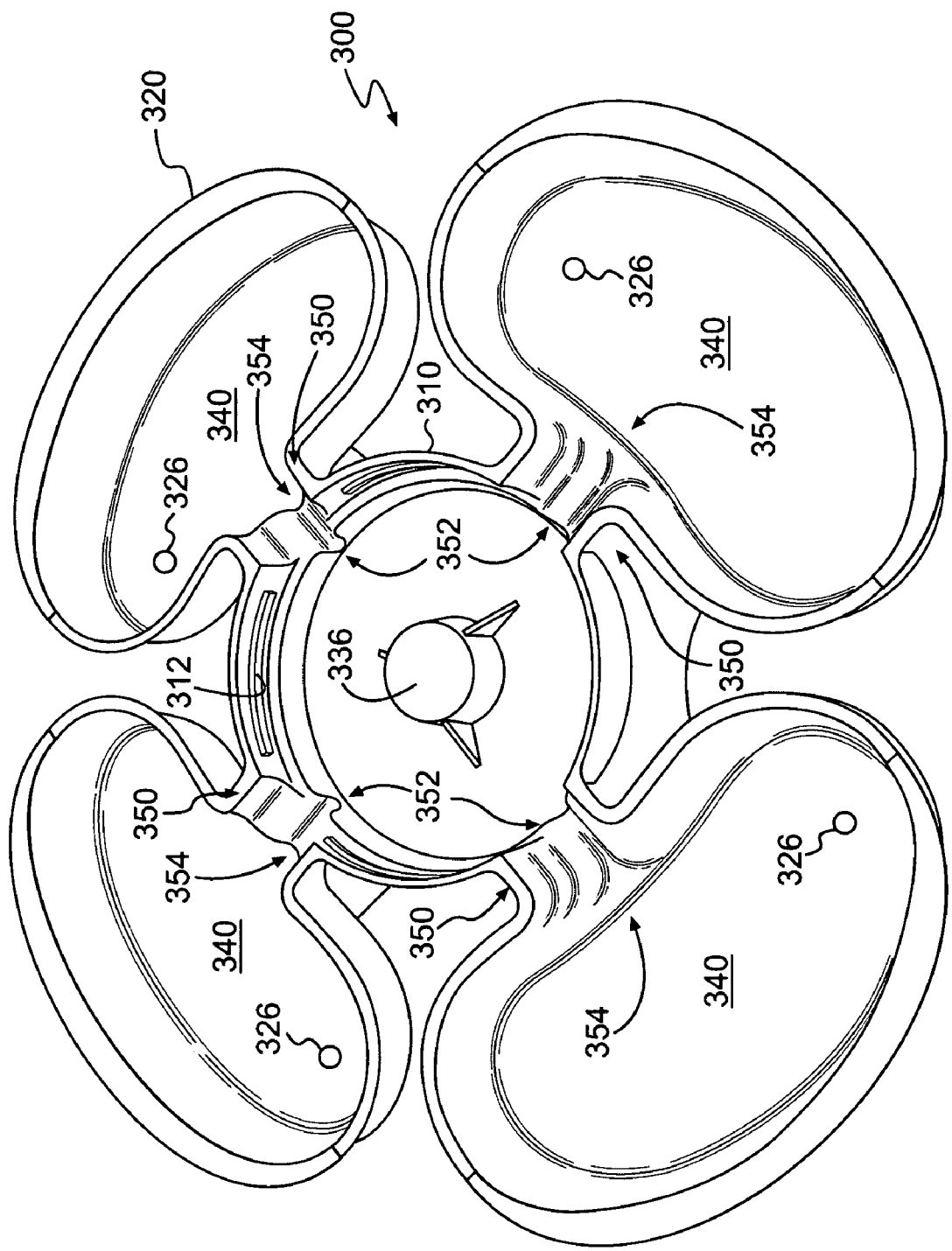
FIG. 3 shows a first perspective view of an exemplary bird bath of the invention.

Coupling portion 310 includes mating unit 312 which is configured to mate with corresponding mating unit associated with a water reservoir (e.g., reservoir 200). Preferably, as shown in FIG. 3, coupling portion 310 has a circular shape. The circular shape is desired for accommodation of a reservoir that has circular coupling region. Coupling portion 310 may have a different shape, for example, a square shape coupling portion can be used to couple with a reservoir with a similar square shape coupling region. In summary, coupling portion 310 can be configured to any shape to correspond with the shape of a coupling region of a reservoir.

Figure 5:
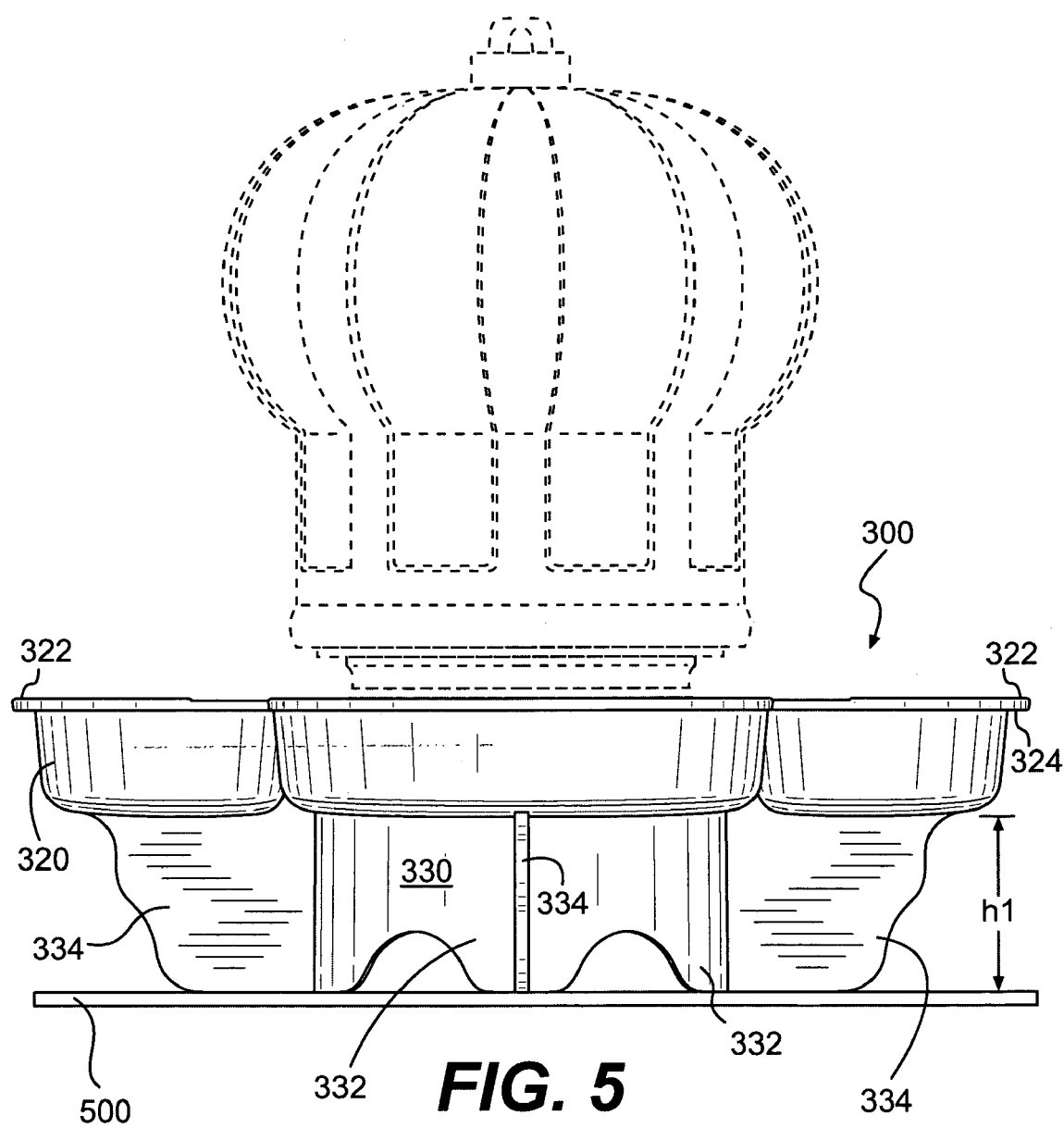
FIG. 5 is a schematic diagram showing a side view of the exemplary bird bath depicted in FIG. 3.
Figure 6:
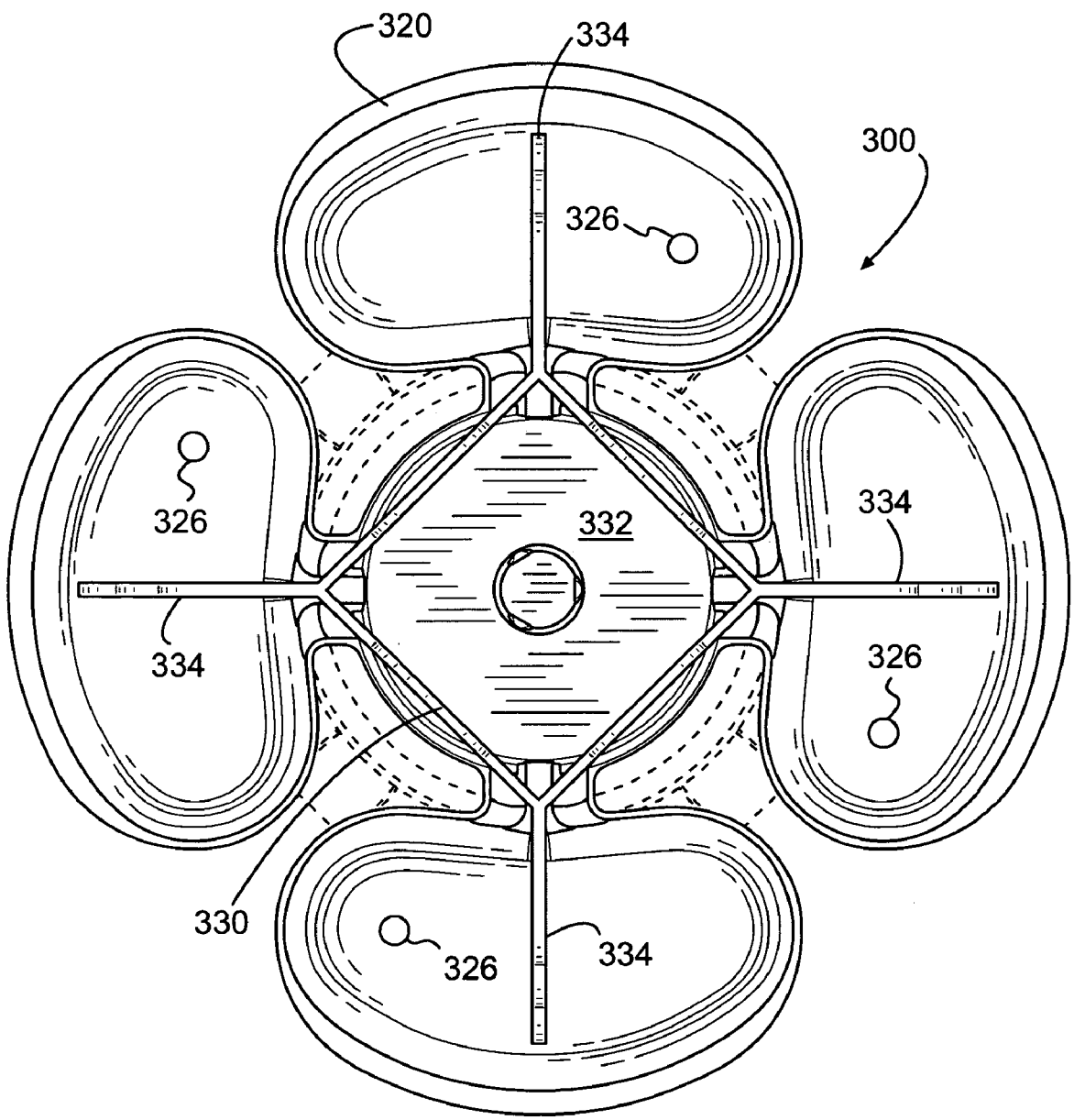
FIG. 6 is a schematic diagram showing a bottom view of the exemplary bird bath depicted in FIG. 3.
Figure 7:
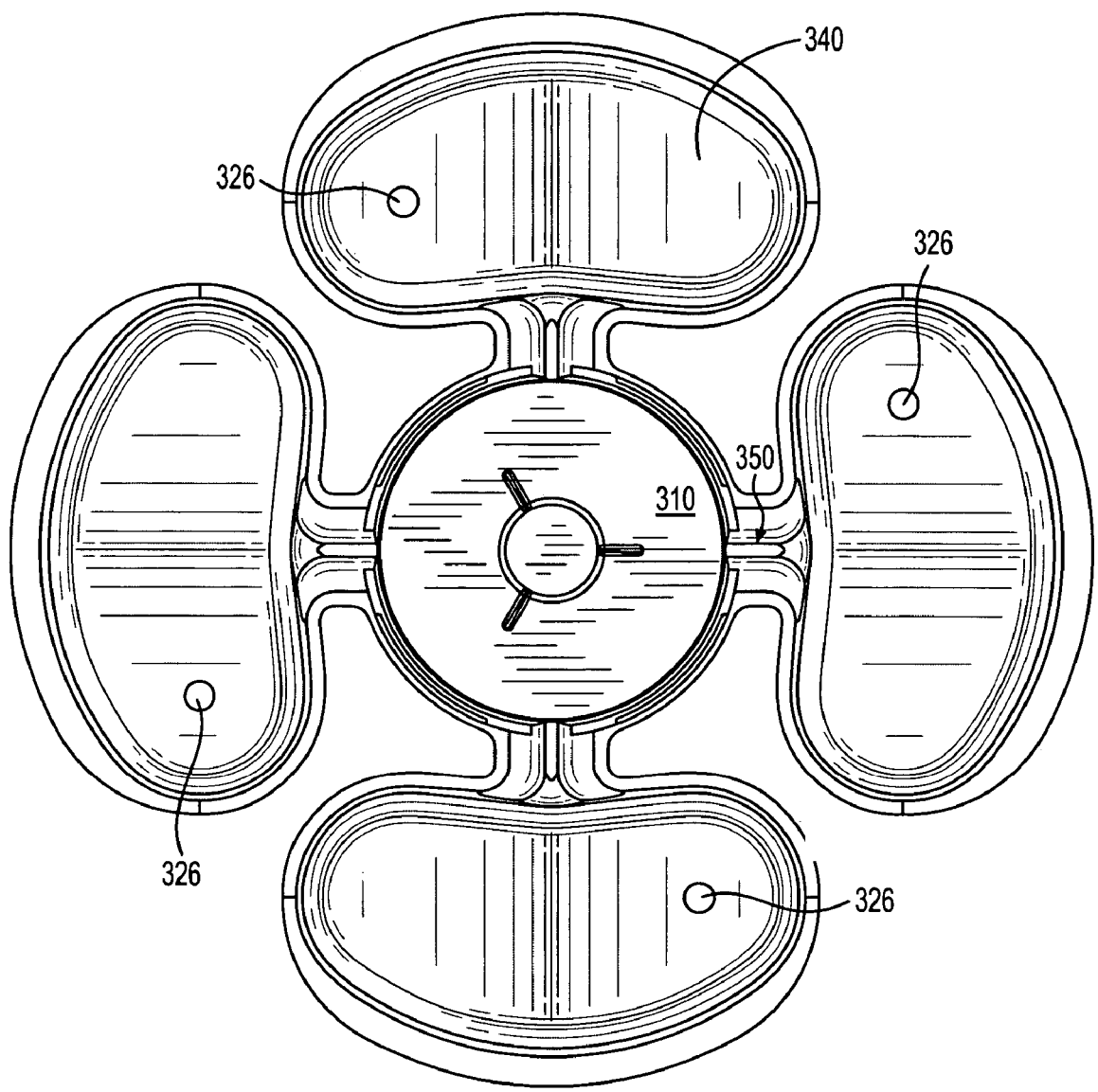
FIG. 7 shows a top view of the exemplary bird bath depicted in FIG. 3.

Basin portion 320 is configured to accommodate at least one bird. Exemplary basin portion 320 includes four basins 340. Preferably, each basin 340 is appropriately sized to accommodate at least one bird. Basin portion 320 preferably includes perching area 322. Preferably, as shown in FIG. 5, perching area 322 includes cantilever 324. Experiments conducted by the inventor have shown that birds prefer perching area 322 that includes cantilever 324 to a conventional, narrow, and straight edged rim because the birds are able to more securely grasp it. Perching area 322 is configured to support a bird for watering purposes.

When basin portion 320, or any of basins 340, requires cleaning, a user can simply empty/clean it by removing the dirty water therein and then allow water to flow from the reservoir to refill basin portion 320. For example, a quick swipe with a rag to remove the dirty water would enable more fresh water to flow into basin portion 320. This enables the user to clean/refill the basin portion without needing an external water source.

Basin portion 320 can be configured to include at least one plug 326. Plug 326 can be, for example, a rubber plug. Preferably, each basin 340 includes one plug 326. When plug 326 is removed, the water within basin portion 320 drains away. When plug 326 is put in place again, basin portion 320 can retain fresh water that flows from the reservoir.

Preferably, each basin 340 is in fluid communication with coupling portion 310 via channel 350. First end 352 or inlet 352 is configured to receive water from coupling portion 310. Second 354 or outlet 354 is configured to discharge water received from coupling portion 310 into basin 340.

When water level in basin 340 is below a predetermined level, the water in reservoir 200 flows out of the reservoir into coupling portion 310, and then discharges into basin 340 via channel 350. As the water level in basin 340 raises to the predetermined level, e.g., at or above outlet 354, an air pressure/vacuum equilibrium is reached, resulting in no further water flow inlet 352, and thus no further flow of water out of reservoir 200 is possible. As the water level in basin 340 drops below the predetermined level due to, for example, evaporation or consumption by birds, additional water would flow out of the reservoir to maintain the predetermined level.

Figure 4:
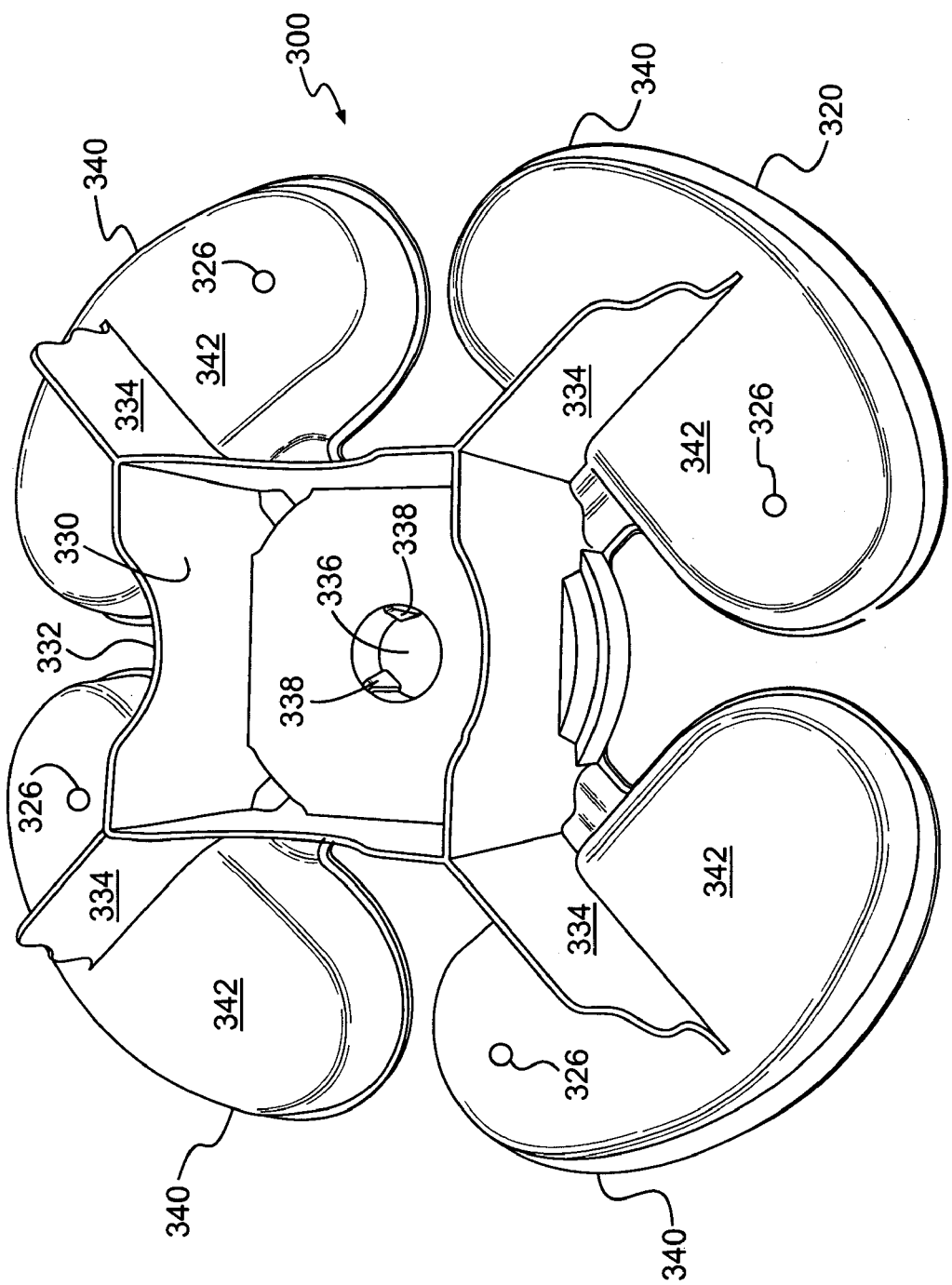
FIG. 4 shows a second perspective view of the exemplary bird bath of the invention shown in FIG. 3.

Support portion 330, as shown in FIG. 4, includes sleeve 332. Fasteners, e.g., nails, screws, bolts, etc. can be used to secure sleeve 332 to a mounting post. As shown in FIG. 5, sleeve 332 is characterized by a height, h1. Height h1 is a function of thickness, t, of the mounting post (see FIG. 1). Thickness t can be the diameter of a point having a circular cross-section. Alternatively, thickness t can be the width of a lumber having a square cross-section. For example, height h1 can be about equal to the radius or width of the mounting post. Preferably, height h1 is at least half of thickness t. In other words, preferred embodiments of the invention includes an h1 that is about the same as or greater than t. If a standard 4"×4" lumber post is used, t would be about 4 inches nominally, and h1 would be about two inches or more, nominally.

This design consideration enables sleeve 332 to extend downward far enough that wind cannot blow bird bath 300 off the mounting post. Preferably, a square shape sleeve 332 (such as that shown in FIG. 4) includes four flanges that are connected to each other to form a box shape. In this manner support portion 330 locks or binds in place over the mounting post when tilted or cocked to the side. Thus, only straight lift upward can remove bird bath 300 from the mounting post.

Alternatively, support portion 330 can be configured to include mounting cave 336. Mounting cave 336 is configured to receive a cylindrical mounting post. For example, mounting cave 336 is appropriately sized to receive a standard pipe with a nominal diameter of about one inch. Mounting cave 336 is preferably between about one-half inch to one inch deep. Mounting cave 336 preferably includes at least one tooth 338, which is configured to provide snug fit with the cylindrical mounting post.

Preferably, support portion 330 further includes one or more legs 334. Each leg preferably connects bottom surface 342 of basin 340 to sleeve 332. Preferably, as shown in FIG. 4, legs 334 are connected to each corner of sleeve 332 to form an "X" shape. As shown in FIG. 5, each leg 334 preferably has a height that is same as h1 of sleeve 332. This allows legs 334, along with sleeve 332, to rest squarely or evenly on supporting surface 500. Supporting surface 500 can be, for example, an elevated pedestal, top of retaining wall, or simply the ground.

Figure 8:
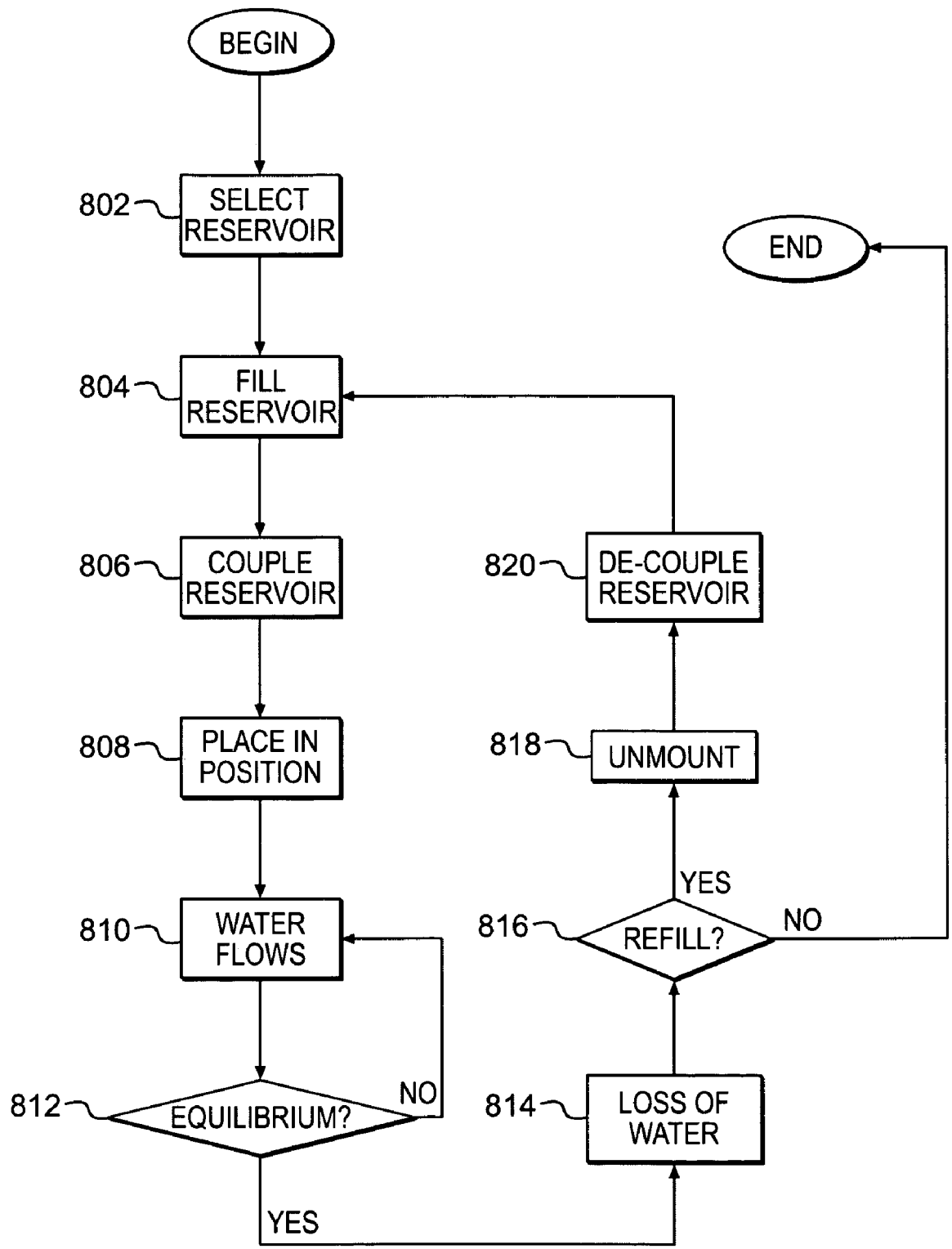
FIG. 8 is a flowchart showing an exemplary method for using the exemplary bird bath shown in FIGS. 3–7.

FIG. 8 is a flowchart showing an exemplary method for using the exemplary bird bath shown in FIGS. 3–7.

In step 802, a suitable water reservoir is selected. The suitable water reservoir has a coupling region that mates with coupling portion 310. For example, reservoir 200 may be selected.

In step 804, the reservoir is filled with water. For example, the reservoir may be inverted so that its mouth faces upwards so that water can be poured into the interior of the reservoir.

In step 806, bird bath 300 is coupled to the reservoir. In a preferred embodiment that includes corresponding spiral threads on each of the coupling region of the reservoir and coupling portion 310, bird bath 300 is twisted (usually clockwise) relative to the reservoir.

In step 808, bird bath 300 is placed in its operating position. As discussed above, bird bath can be rested on a flat surface (e.g., surface 500), hung (using hanging device 202), or preferably, mounted on a mounting post and secured.

In step 810, water is allow to flow from the reservoir into basin portion 320. In the exemplary embodiment shown, water flows from the reservoir into coupling portion 310, through inlets 352 and outlets 354 of channels 350, into each of basin 340.

In step 812, if the air pressure/vacuum equilibrium is reached, the process goes to step 814. Otherwise, water continues to flow until the air pressure/vacuum equilibrium is reached. As known in the art, the air pressure/vacuum equilibrium is reached when water level in basins 340 reaches at or above outlets 354. The water level in basins 340 at the air pressure/vacuum equilibrium is hereinafter known as the predetermined level.

In step 814, as water is consumed (or evaporated or otherwise lost due to spillage, etc.), the air pressure/vacuum equilibrium is disturbed, resulting in water to flow out of the reservoir into basins 340 to maintain the predetermined level.

In step 816, when refilling is needed, the process goes to step 818.

In step 818, bird bath 300 is taken off, e.g., removed from the mounting post.

In step 820, the reservoir is de-coupled from bird bath 300. In the preferred embodiment that includes corresponding spiral threads on each of the reservoir and coupling portion 310, bird bath 300 is twisted off (usually counter-clockwise relative to reservoir 200) and separated from the reservoir. The reservoir is then placed up-side-down and the process returns to step 804.

Figure 9:
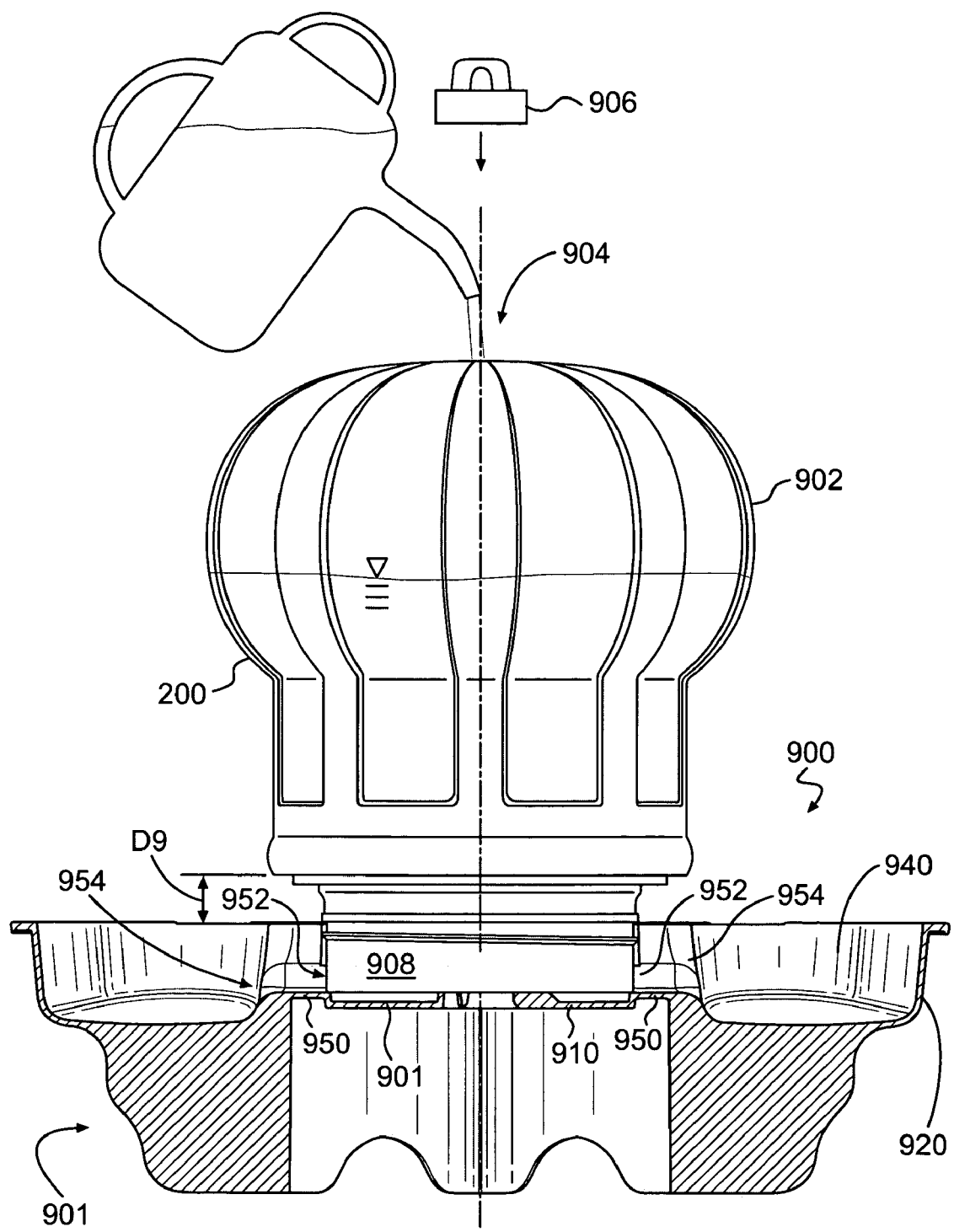
FIG. 9 shows another exemplary bird bath of the invention depicted in its refilling position.
Figure 10:
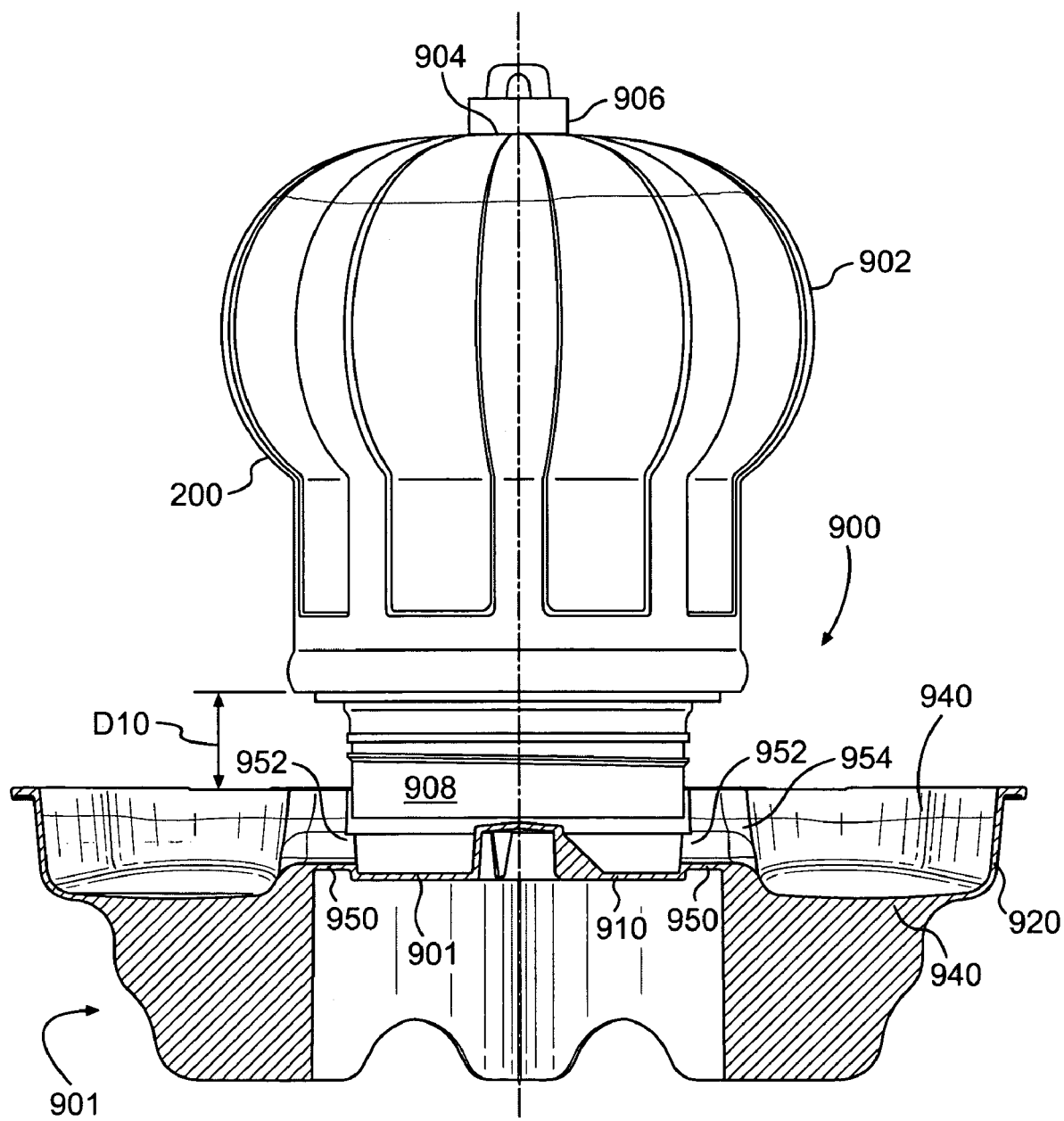
FIG. 10 shows the exemplary bird bath of FIG. 9 depicted in its operating position.

FIG. 9 shows another exemplary bird bath of the invention depicted in its refilling position. FIG. 10 shows the exemplary bird bath of FIG. 9 depicted in its operating position. Note that the refilling position and the operating position are indicated by the difference between distance D9 and distance D10 shown in FIGS. 9 and 10, respectively.

In this exemplary embodiment, bird bath 900 includes base 901 and reservoir 902. Base 901 includes coupling portion 910 and basin portion 920. Reservoir 902 includes orifice 904, cap 906, and coupling region 908. As described above, base 901 and reservoir 902 are configured to couple to each other. Known coupling means, e.g., complementing spiral threads, can be used as mating units for coupling base 901 to reservoir 902.

Basin portion 920 includes at least one basin 940, each of which is preferably sized to include at least one bird. However, it is noted that exemplary bird bath 900 can be modified to include a smaller basin that serves as a waterer only, and not also as a bird bath.

Preferably, base 901 includes channel 950 that provides fluid communication between coupling portion 910 and basin 940. Channel 950 includes inlet 952 and outlet 954. In the operating position as shown on FIG. 10, water flows from reservoir 902 into coupling portion 910, through channel 950, and into basin 940. Note that in the operating position, coupling region 908 does not block inlet 952, thereby providing fluid communication between reservoir 902 and basin portion 920.

In the refilling position shown on FIG. 9, coupling region 908 is shown to block inlet 952, thereby cutoff the fluid communication between reservoir 902 and basin portion 920. As shown in FIGS. 9 and 10, reservoir 902 can be lowered by a distance (decreasing distance D10 to distance D9) to reach the refilling position from the operating position. Lowering of reservoir 902 can be accomplished, for example, by twisting reservoir 902 in one direction (usually clockwise). To raise reservoir 902 back to the operating position from the refilling position, reservoir 902 is twisted the other way (e.g., counter-clockwise) to raise distance D9 to distance D10. In a different embodiment in which different coupling means is used, reservoir 902 can be pushed down or pulled up to change between the operating and refilling positions. Alternatively, bird bath 900 can be configured to include one or more of valves or gates to shut off inlet 952 to enable refilling.

In the refilling position, cap 906 is removed to expose orifice 904 to allow water be poured into the interior of reservoir 902. In the operating position, on the other hand, cap 906 closes orifice 904. Preferably, cap 906 is configured to provide an air-tight seal over orifice 904.

Exemplary bird bath 900 enables its user to refill reservoir 902 without dismounting it from a mounting post. As explained below and illustrated in FIG. 11, a user of exemplary bird bath 900 does not have to perform a number of steps that would otherwise be required. For example, the user does not have to dismount the bird bath from a mounting post, turn the bird bath up-side-down, and separate the base from the reservoir before refilling. In addition, after refilling, the user is not required to perform additional steps, including, couple the base to the reservoir, turn the bird bath up-side-up, and then re-mount the bird bath on the mounting post.

Figure 11:
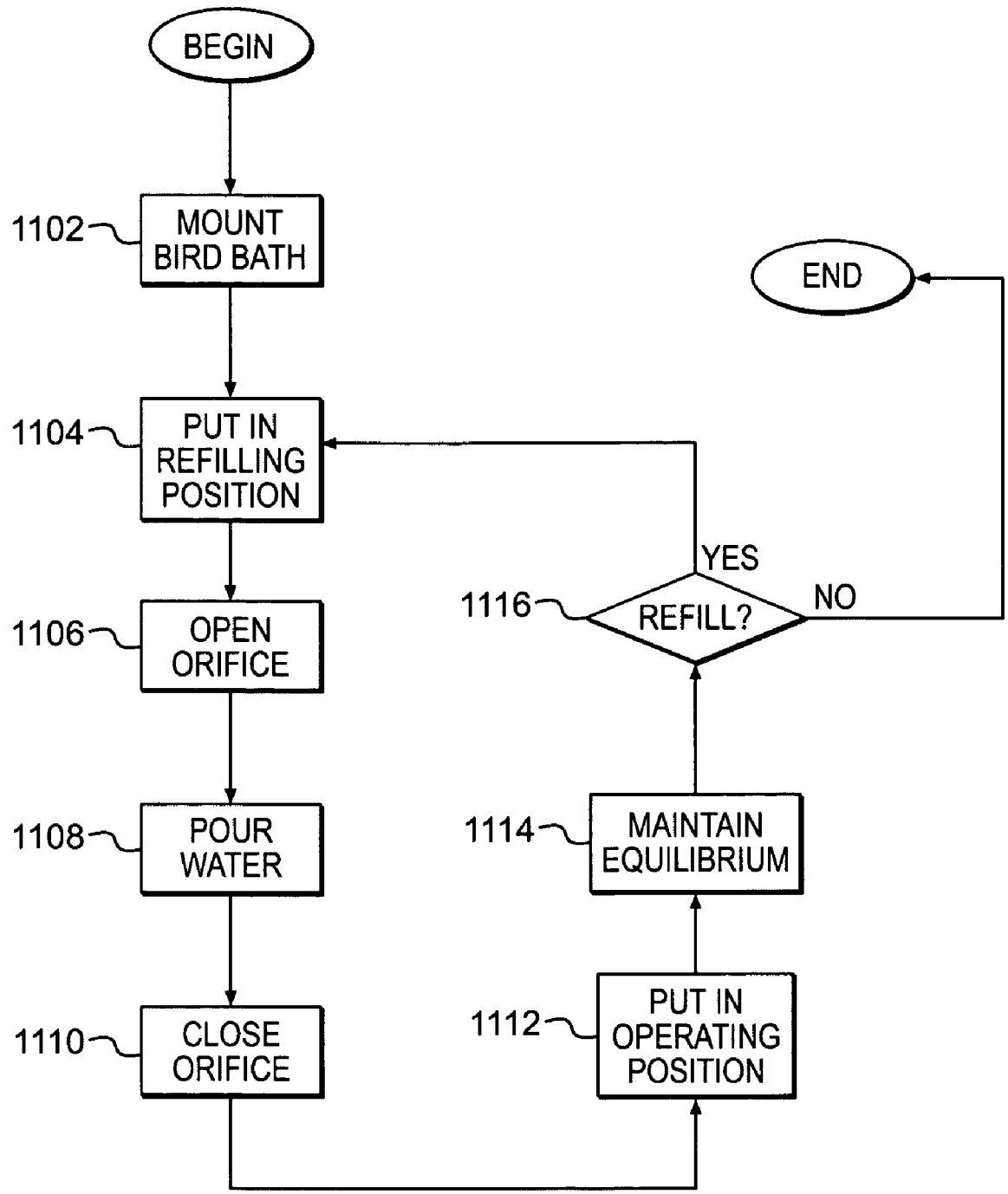
FIG. 11 is a flowchart showing an exemplary method for using the exemplary bird bath shown in FIGS. 9–10.

FIG. 11 is a flowchart showing an exemplary method for using the exemplary bird bath shown in FIGS. 9–10.

In step 1102, bird bath 900 is mounted on a mounting post. Preferably, reservoir 902 is left empty to enable easy mounting. Mounting bird bath 900 with water in it could cause spillage and unnecessary loss of water. Base 901 can be, for example, be permanently secured on a mounting post. As described above, base 901 can be configured to include a support portion that can be mounted a lumber post.

In step 1104, reservoir 902 is lowered so that coupling region 908 shuts off inlet 952 of channel 950. In this configuration, bird bath 900 is in its refilling position.

In step 1106, cap 906 is removed or otherwise opened to expose orifice 904.

In step 1108, water is poured into reservoir 902 via orifice 904.

In step 1110, cap 906 is used to seal off orifice 904.

In step 1112, reservoir 902 is raised from distance D9 to distance D10 so that coupling region 908 no longer blocks inlet 952 of channel 950. In this configuration, bird bath 900 is in its operating position, and water flows from reservoir 902 into basin portion 920 until an air pressure/vacuum equilibrium is reached. The air pressure/vacuum equilibrium is typically reached when water level in basin portion 920 is at or above outlet 954 of channel 950 (the predetermined level).

In step 1114, as water is lost from basin portion 920 (e.g., due to evaporation, spillage, consumption by birds, etc.) so that the air pressure/vacuum equilibrium is disturbed, water continues to flow from reservoir 902 into basin portion 920 to restore the air pressure/vacuum equilibrium and maintain the predetermined level.

In step 1116, when refilling is needed, the process returns to step 1104.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A bird bath comprising:
   a coupling portion configured to be coupled to a water reservoir and a basin portion configured to have fluid communication with the coupling portion, wherein the coupling portion is configured to couple with the reservoir in one of an operating position and a refilling position, wherein water is shutoff from the reservoir when the reservoir is set in the refilling position, and wherein the basin portion is sized to accommodate at least one bird; and
   a support portion located beneath one or both of the coupling portion and the basin portion, wherein the support portion comprises a sleeve configured to receive a mounting post, wherein a first end of the sleeve is connected to a bottom surface of the coupling portion and a second end of the sleeve is configured to touch a surface on which the support portion rests.

2. The bird bath of claim 1, further comprising a channel having an inlet and an outlet, the inlet is configured to receive water from the coupling portion and the outlet is configured to release the water to the basin portion.

3. The bird bath of claim 1, wherein the basin portion comprises a rim having a cantilever.

4. The bird bath of claim 1, wherein the basin portion includes two or more basins, each basin is sized to accommodate at least one bird.

5. The bird bath of claim 1, wherein the basin portion includes four basins, each basin is sized to accommodate at least one bird.

6. The bird bath of claim 1, wherein the support portion comprises four legs.

7. The bird bath claim 1, wherein the sleeve is a rectangular sleeve.

8. The bird bath of claim 1, wherein the support portion further comprises four legs, wherein a first end of each of the four legs is connected to a bottom surface of the basin portion and a second end of each of the four legs is connected to an outer surface of the sleeve.

9. The bird bath of claim 8, wherein the sleeve is a rectangular sleeve with four corners, wherein each of the four legs is further connected to one of the four corners of the rectangular sleeve.

10. The bird bath of claim 9, wherein a first end of the rectangular sleeve is connected to a bottom surface of the coupling portion and a second end of the rectangular sleeve is configured to touch a surface on which the support portion rests, and wherein each of the four legs is further connected to a corner of the rectangular sleeve.

11. A bird bath for coupling with a water reservoir, comprising:
- a coupling portion configured to couple with the water reservoir containing water, wherein the coupling portion is configured to couple with the reservoir in one of an operating position and a refilling position, wherein water is shutoff from the reservoir when the reservoir is set in the refilling position;
- a basin portion in fluid communication with the coupling portion; and
- a support portion located beneath one or both of the coupling portion and the basin portion, wherein the support portion comprises a sleeve configured to receive a mounting post, wherein a first end of the sleeve is connected to a bottom surface of the coupling portion and a second end of the sleeve is configured to touch a surface on which the support portion rests.

12. The bird bath of claim 11, wherein the basin portion includes one or more basins sized to accommodate a bird.

13. The bird bath of claim 11, wherein the support portion is configured to rest on a flat surface.

14. The bird bath of claim 11, wherein the basin portion comprises a leg connecting a bottom surface of the basin portion to the support portion.

15. The bird bath of claim 11, further comprising a removable plug disposed on the basin portion.

16. The bird bath of claim 11, wherein the sleeve is a rectangular sleeve.

17. The bird bath of claim 11, wherein the sleeve has a length that is about or greater than a radius or one-half of a thickness of the mounting post.

18. The bird bath of claim 11, wherein the basin portion comprises at least a first basin and a second basin, each of the first basin and the second basin in fluid communication with the coupling portion.

19. The bird bath of claim 18, wherein each of the first basin and the second basin is configured to receive water from the coupling portion but not from the other basin.

20. The bird bath of claim 18, wherein the first basin and the second basin are located on opposite sides of the coupling portion.

21. A bird bath comprising:
- a reservoir configured to contain water; and
- a base configured to couple with the reservoir, the base includes at least a first basin and a second basin, wherein each of the first basin and the second basin is configured to receive water from the reservoir but not from the other basin, wherein the base comprises a support portion, the support portion comprises a sleeve configured to receive a mounting post, wherein a first end of the sleeve is connected to a bottom surface of the base and a second end of the sleeve is configured to touch a surface on which the support portion rests, wherein the base comprises a coupling portion configured to couple with the reservoir in one of an operating position and a refilling position, wherein water is shutoff from the reservoir when the reservoir is set in the refilling position.

22. The bird bath of claim 21, wherein the reservoir and the base have corresponding mating units for coupling to each other.

23. The bird bath of claim 22, wherein the mating units include spiral threads.

24. The bird bath of claim 21, further comprising at least one plug disposed on at least one of the first basin and the second basin.

25. The bird bath of claim 21, further comprising a hanging device disposed on the reservoir.

26. The bird bath of claim 21 wherein the sleeve is a rectangular sleeve.

27. The apparatus of claim 26, wherein the support portion comprises four legs and the rectangular sleeve comprises four corners, wherein each of the four legs is connected to one of the four corners of the rectangular sleeve.

28. The bird bath of claim 21, wherein each of the first basin and the second basin is appropriately sized to function as a bird bath.

29. The bird bath of claim 21, wherein each of the first basin and the second basin is configured to received water from the reservoir via a channel, wherein when the water in the basin reaches a level at or above the channel, a vacuum created in the reservoir prevents additional flow of the water from the reservoir.

30. The bird bath of claim 21, wherein at least one rim of one of the first basin and the second basin is appropriately sized to function as a perching area for a bird.

31. An apparatus for attracting birds, comprising:
- a reservoir configured to contain water, wherein the reservoir comprises a first mating unit;
- a base comprising a coupling portion and a basin portion, the coupling portion comprises a second mating unit configured to couple with the reservoir in one of an operating position and a refilling position; and
- a support portion located beneath one or both of the coupling portion and the basin portion, wherein the support portion comprises a sleeve configured to receive a mounting post, wherein a first end of the sleeve is connected to a bottom surface of the coupling portion and a second end of the sleeve is configured to touch a surface on which the support portion rests,
- wherein water flows from the reservoir to the basin portion to maintain a predetermined water level in the basin portion when the reservoir is set in the operating position,
- wherein water is shutoff from the reservoir when the reservoir is set in the refilling position.

32. The apparatus of claim 31, wherein the basin portion is sized to accommodate at least one bird.

33. The apparatus of claim 31, wherein the reservoir further comprises a removable cap and an opening through which additional water is placed in the reservoir when the reservoir is set in the refilling position.

34. The apparatus of claim 31, wherein the reservoir is lowered to close a channel of the base to change the reservoir from the operating position to the refilling position.

35. The apparatus of claim 31, wherein the basin portion comprises four basins, each basin is sized to accommodate at least one bird.

36. The apparatus of claim 35, wherein the four basins are symmetrically positioned around the coupling portion.

37. The apparatus of claim 35, wherein the support portion includes the sleeve and four legs, each of the four legs connects each of the four basins to the sleeve.

38. The apparatus of claim 37, wherein the support portion and each of the four legs are configured to touch a surface on which the support portion rests.

39. The apparatus of claim 37, wherein each of the four legs is connected to a corner of the sleeve to form an "X" pattern.

* * * * *